United States Patent [19]

Ohosuga

[11] Patent Number: 4,839,786

[45] Date of Patent: Jun. 13, 1989

[54] DC-DC CONVERTER

[75] Inventor: Ichirho Ohosuga, Tokyo, Japan

[73] Assignee: Minicam Research Corporation, Tokyo, Japan

[21] Appl. No.: 255,042

[22] Filed: Oct. 7, 1988

[30] Foreign Application Priority Data

Oct. 26, 1987 [JP] Japan .................. 62-163319[U]

[51] Int. Cl.4 ............................................. H02H 7/10
[52] U.S. Cl. ...................................... 363/52; 363/55; 363/16; 361/91; 361/111
[58] Field of Search ...................... 363/16-25, 363/52-58, 95-98, 131-136; 361/90, 91, 111

[56] References Cited

U.S. PATENT DOCUMENTS

| | | | |
|---|---|---|---|
| 4,286,314 | 8/1981 | Molyneux-Berry | 363/55 |
| 4,566,051 | 1/1986 | Komulainen | 363/55 X |
| 4,783,727 | 11/1988 | Neumann | 363/56 X |

FOREIGN PATENT DOCUMENTS

| | | | |
|---|---|---|---|
| 130771 | 8/1983 | Japan | 363/56 X |
| 613464 | 6/1978 | U.S.S.R. | 363/21 X |
| 1171921 | 8/1985 | U.S.S.R. | 363/21 X |

Primary Examiner—Peter S. Wong
Assistant Examiner—Emanuel Todd Voeltz
Attorney, Agent, or Firm—Bauer & Schaffer

[57] ABSTRACT

A DC-DC converter of simple arrangement that effectively utilizes a negative voltage to improve loss of power. This DC-DC converter is suitable as a dc power source for an electronic flash of a camera.

3 Claims, 2 Drawing Sheets

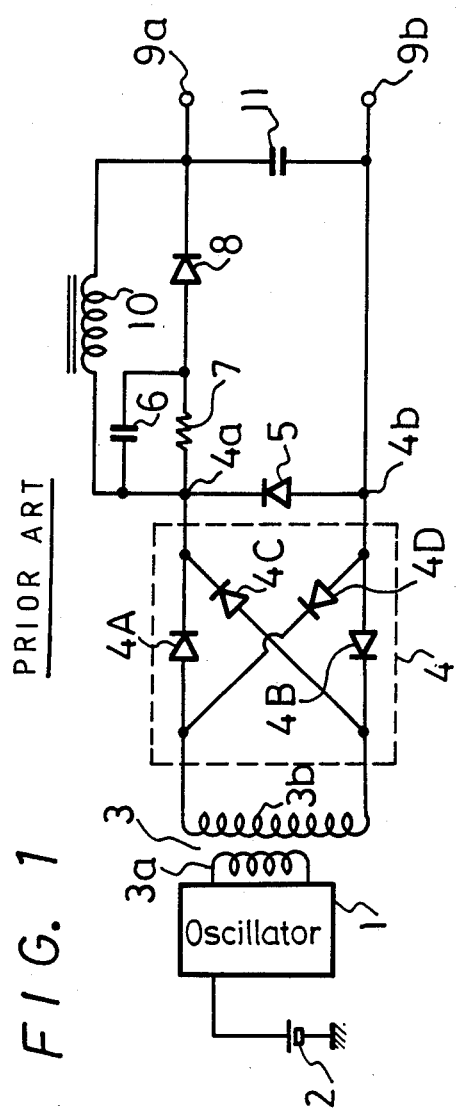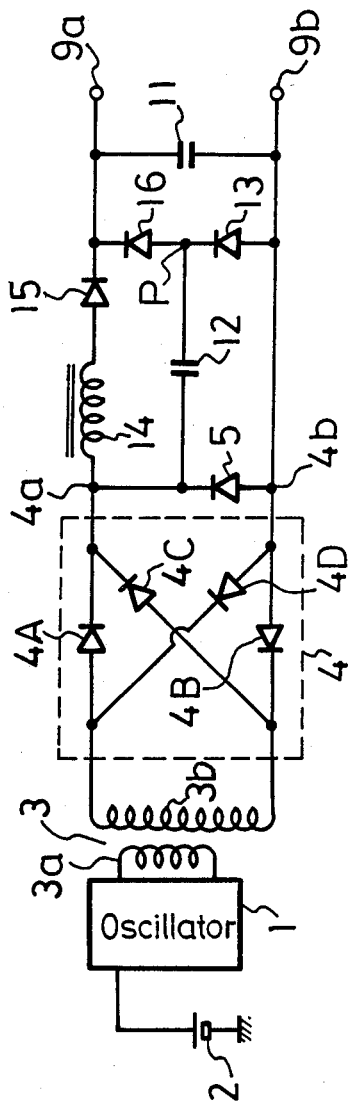

(−250V)

DC-DC CONVERTER

BACKGROUND OF THE INVENTION

1. Field of the Invention

The present invention relates generally to DC-DC converters and, more particularly, is directed to a DC-DC converter for use as a dc power source for an electronic flash of a camera or the like.

2. Description of the Prior Art

As a dc power source for an electronic flash of a camera, there is employed a DC-DC converter shown in FIG. 1 in the prior art. Referring to FIG. 1, there is provided an oscillator 1 which is formed of an astable multivibrator. This oscillator 1 oscillates at a frequency of, for example, 22 kHz. A battery 2 of, for example, 24 V is used as a dc power source for the oscillator 1. The oscillation output signal from the oscillator 1 is supplied to a primary winding 3a of a transformer 3. One and the other ends of a secondary winding 3b of the transformer 3 are respectively connected to one and the other input ends of a full-wave rectifying circuit 4 which comprises four diodes 4A, 4B, 4C and 4D connected with the polarities as shown in FIG. 1. One output terminal 4a of the full-wave rectifying circuit 4 is connected through a fly-wheel diode 5 to the other output terminal 4b of the full-wave rectifying circuit 4. The output terminal 4a of the full-wave rectifying circuit 4 is connected through a series circuit formed of a parallel circuit of a capacitor 6 and a resistor 7 and a reverse-blocking diode 8 forming a spike voltage removing circuit to one output terminal 9a. The output terminal 4a of the full-wave rectifying circuit 4 is further connected to the output terminal 9a through a choke coil 10. The other output terminal 9b is led out from the other output terminal 4b of the full-wave rectifying circuit 4, and a smoothing capacitor 11 is connected between both output terminals 9a and 9b.

In the thus arranged conventional DC-DC converter, the oscillator 1 generates an oscillation signal of which the peak value is 24 V. This oscillation signal of 24 V is increased to, for example, 500 V by the transformer 3. Then, the oscillation signal having the peak value of 500 V is rectified by the full-wave rectifying circuit 4. The rectified signal from the full-wave rectifying circuit 4 is smoothed by the smoothing capacitor 11 to thereby produce a dc voltage of, for example, 460 V.

The known DC-DC converter shown in FIG. 1, however, cannot remove the following defects. That is, the full-wave rectifying circuit 4 produces across its output terminals 4a and 4b comparatively large spike voltages at the leading edge and the trailing edge of the square wave shown in FIG. 2A. Since in the example of the conventional DC-DC converter shown in FIG. 1 the negative spike voltage is removed by the capacitor 6, the resistor 7 and the diode 8 and only the positive voltage in FIG. 2A is supplied to and smoothed by the smoothing capacitor 11, the negative spike voltage cannot be utilized effectively. This negative spike voltage causes the capacitor 6, the resistor 7, the diode 8 or the like to generate heat and, also loses the power.

OBJECTS AND SUMMARY OF THE INVENTION

Accordingly, it is an object of the present invention to provide an improved DC-DC converter which can remove the above-mentioned shortcomings encountered with the prior art.

It is another object of the present invention to provide a DC-DC converter of simple arrangement which can effectively utilize a spike voltage to improve loss of power.

It is a further object of the present invention to provide a DC-DC converter suitable as a power source for an electronic flash of a camera or the like.

According to an aspect of the present invention, there is provided a DC-DC converter comprising:

(a) oscillator means being oscillated by a dc power source;

(b) rectifying circuit means for rectifying an output signal from said oscillator means;

(c) fly-wheel diode means connected between a first output terminal of said rectifying circuit means and a second output terminal thereof;

(d) first series circuit means formed of capacitor means and first reverse-blocking diode means, said first series circuit means being connected between said first output terminal of said rectifying circuit means and said second output terminal thereof;

(e) second series circuit means formed of choke coil means and second reverse-blocking diode means, said second series circuit means being connected between said first output terminal of said rectifying circuit means and a first output terminal of the DC-DC converter;

(f) third reverse-blocking means connected between a junction of said first capacitor means with said first reverse-blocking diode means and said first output terminal of said DC-DC converter, a second output terminal of said DC-DC converter being led out from said second output terminal of said rectifying circuit means; and (g) smoothing capacitor means being connected between said first and second output terminal of said DC-DC converter.

The above, and other objects, features and advantages of the present invention will become apparent from the following detailed description of the preferred embodiment to be taken in conjunction with the accompanying drawings, in which like reference numerals identify the same or similar parts.

BRIEF DESCRIPTION OF THE DRAWINGS

FIG. 1 is a schematic diagram showing an example of a conventional DC-DC converter;

FIG. 3 is a schematic diagram showing an embodiment of a DC-DC converter according to the present invention.

DETAILED DESCRIPTION OF THE PREFERRED EMBODIMENT

Figure 2A:
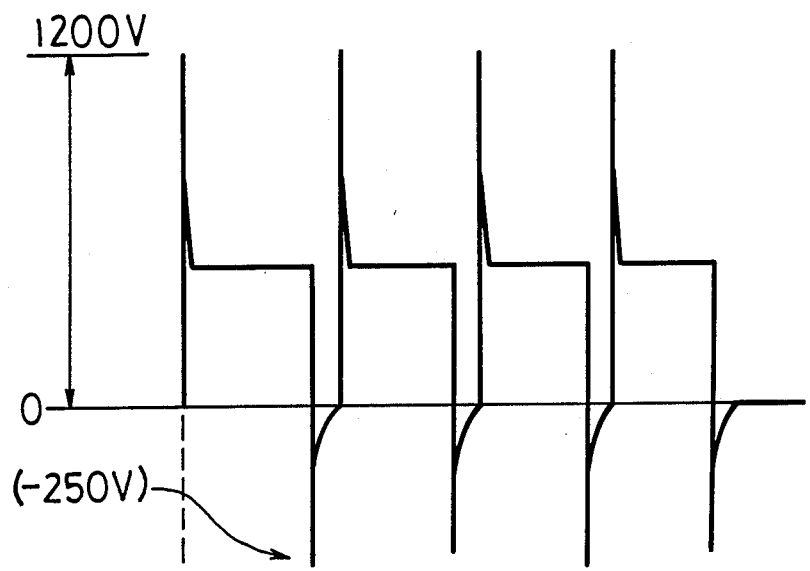
FIGS. 2A and 2B are respectively waveform diagrams useful for explaining the present invention.

An embodiment of a DC-DC converter according to the present invention will now be described with reference to FIG. 3. In FIG. 3, like parts corresponding to those of FIG. 1 are marked with the same references and therefore need not be described in detail.

Also in the embodiment of the present invention shown in FIG. 3, the battery 2 of, for example 24 V drives the oscillator 1 formed of the astable multivibrator to oscillate at the frequency of, for example, 22 kHz. The oscillation output signal from the oscillator 1 has the peak value of 24 V. This oscillation output signal is supplied to the transformer 3, in which it is converted to a square wave signal of which the peak value is, for example, 500 V. This square wave signal is then supplied to the full-wave rectifying circuit 4 which comprises four diodes 4A, 4B, 4C and 4D as earlier noted. In this respect, the full-wave rectifying circuit 4 produces across its both other output terminals 4a and 4b the rectified output voltages having positive and negative spike voltages as shown in FIG. 2A, similarly as described above.

The one output terminal 4a of the full-wave rectifying circuit 4 is connected through the fly-wheel diode 5 to the other output terminal 4b thereof. Further, the output terminal 4a of the full-wave rectifying circuit 4 is connected to the other output terminal 4b thereof through a series circuit of a non-polarized capacitor 12 and a first reverse blocking diode 13. The non-polarized capacitor 12 may have a withstand voltage of, for example, 510 V and of which the capacitance value is 120 microfarads. The one output terminal 4a of the full-wave rectifying circuit 4 is connected through a series circuit of a choke coil 14 which blocks a high frequency and a second reverse-blocking diode 15 to the output terminal 9a of the DC-DC converter. The junction P between the capacitor 12 and the first reverse-blocking diode 13 is connected to the output terminal 9a via a third reverse-blocking diode 16. Then, the other output terminal 9b of the DC-DC converter is led out from the other output terminal 4b of the full-wave rectifying circuit 4 and the smoothing capacitor 11 is interposed between both the output terminals 9a and 9b.

Figure 2B:
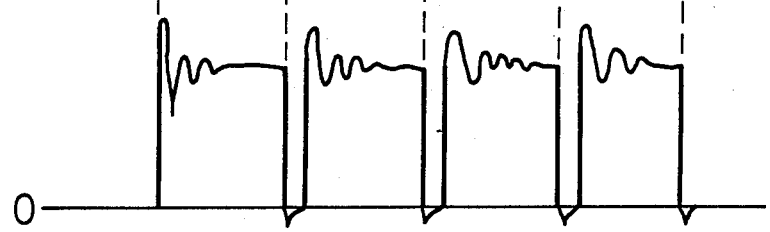

According to the embodiment of the present invention thus arranged, the full-wave rectifying circuit 4 produces at its output side a rectified output voltage of a waveform having a negative spike voltage as shown in FIG. 2A. When the full-wave rectifying circuit 4 produces the negative spike voltage, a current flows from the other output terminal 4b through the diode 13 and the capacitor 12 to the one output terminal 4a, thus charging the capacitor 12. Meanwhile, when the full-wave rectifying circuit 4 generates the positive voltage (including the spike voltage), the low frequency component thereof flows from the one output terminal 4a through the choke coil 14, the diode 15 and the smoothing capacitor 11 to the other output terminal 4b, thus charging the smoothing capacitor 11 via the choke coil 14 and the diode 15. At the same time, the high frequency component thereof flows from the one output terminal 4a through the capacitor 12, the diode 16 and the smoothing capacitor 11 to the other output terminal 4b, thus supplying a charge superimposed upon the charge previously charged in the capacitor 12 by the negative spike voltage to the smoothing capacitor 11 so that the smoothing capacitor 11 is charged. The above operations are repeatedly effected, whereby according to this embodiment, the voltage with the waveform shown in FIG. 2B is supplied to the smoothing capacitor 11 so that a dc voltage of, for example, 460 V is developed between the output terminals 9a and 9b of the DC-DC converter. In this case, the smoothing capacitor 11 is also charged by the negative spike voltage so that the negative spike voltage appearing at the output side of the full-wave rectifying circuit 4 can be effectively utilized. Thus, the loss of power can be improved.

According to the present invention, as set forth above, it is possible to obtain a DC-DC converter of a simplified arrangement which can effectively utilize the negative spike voltage produced at the output side of the full-wave rectifying circuit 4. Thus, in practice, the loss of power can be improved and the battery can be efficiently utilized as the power source for the electronic flash of the camera.

It should be understood that the above description is presented by way of example on a single preferred embodiment of the invention and it will be apparent that many modifications and variations thereof could be effected by one skilled in the art without departing from the spirit and scope of the novel concepts of the invention so that the scope of the invention should be determined only by the appended claims.

I claim as my invention:

1. A DC-DC converter comprising:
   (a) oscillator means being oscillated by a dc power source;
   (b) rectifying circuit means for rectifying an output signal from said oscillator means;
   (c) fly-wheel diode means connected between a first output terminal of said rectifying circuit means and a second output terminal thereof;
   (d) first series circuit means formed of capacitor means and first reverse-blocking diode means, said first series circuit means being connected between said first output terminal of said rectifying circuit means and said second output terminal thereof;
   (e) second series circuit means formed of choke coil means and second reverse-blocking diode means, said second series circuit means being connected between said first output terminal of said rectifying circuit means and a first output terminal of the DC-DC converter;
   (f) third reverse-blocking means connected between a junction of said capacitor means with said first reverse-blocking diode means and said first output terminal of said DC-DC converter, a second output terminal of said DC-DC converter being led out from said second output terminal of said rectifying circuit means; and
   (g) smoothing capacitor means being connected between said first and second output terminal of said DC-DC converter.

2. A DC-DC converter as claimed in claim 1, wherein said capacitor means of said first series circuit means is a non-polarized capacitor.

3. A DC-DC converter as claimed in claim 2, wherein said non-polarized capacitor has a withstanding voltage of 510 volts and a capacitance of 120 microfarads.

* * * * *